United States Patent [19]

Ginns et al.

[11] Patent Number: 4,535,624

[45] Date of Patent: Aug. 20, 1985

[54] ENGINE MONITORING SYSTEM

[75] Inventors: Haskell Ginns, Belmont; Albert E. Finn, Marblehead, both of Mass.

[73] Assignee: The Indikon Company, Inc., Cambridge, Mass.

[21] Appl. No.: 499,820

[22] Filed: Jun. 1, 1983

[51] Int. Cl.³ .......................................... G01M 15/00

[52] U.S. Cl. .................................. 73/119 R; 324/208

[58] Field of Search ............ 73/119 R; 324/208, 207; 340/679, 682, 686; 33/180 B, 180 AT, 181 AT

[56] References Cited

U.S. PATENT DOCUMENTS

| | | | |
|---|---|---|---|
| 3,456,497 | 7/1969 | Eberl | 73/116 |
| 3,555,416 | 1/1971 | Lucka | 324/207 |
| 4,107,603 | 8/1978 | Slough | 340/682 X |
| 4,430,647 | 2/1984 | Moller | 340/679 |

*Primary Examiner*—Jerry W. Myracle

*Attorney, Agent, or Firm*—Weingarten, Schurgin, Gagnebin & Hayes

[57] ABSTRACT

An extent of travel detection system particularly adapted for measuring piston bottom excursion in an internal combustion engine. Two eddy-current position transducer probes are provided for each piston, the first being positioned to sense piston bottom travel position and the second being operated as a reference probe, mounted in close proximity to the first probe. The first probe of each pair is only operated to measure piston travel within the cylinder during the brief moment that the piston is near its bottom. The actual point of the bottom travel is detected, using the reference probe to compensate for environment effects such as temperature. The measured bottom point for each piston is displayed either by a separate or shared display. Changes in the displays over time indicate engine wear or impending failure. The measured bottom points are typically averaged over a selected number of engine cycles. The engine may be manually cycled, to provide continuous monitoring of the piston excursion distance as the piston proceeds through its cycle to initialize the system. The individual probes can be mounted as add-on instrumentation within existing engines. In addition, other precision dimensions of an engine structure are measured, such as the alignment of the engine housing and enclosure.

8 Claims, 6 Drawing Figures

12
32
34
24
18
16
14
D
30
28
22
20
26
12

ENGINE MONITORING SYSTEM

FIELD OF THE INVENTION

The field of the present invention relates to extent of travel detectors and in particular, engine monitoring equipment having probes for maximum piston excursion measurement.

BACKGROUND OF THE INVENTION

In internal combustion engines, particularly in large installations such as are found with big marine diesels, engine wear and failure can result from several causes. Shaft misalignments can be produced by uneven forces applied to the external engine mounts forcing mounts to change in position and thus applying dangerous internal forces to the crank shaft. Bearing wear can also cause the crank shaft to experience forces of misalignment which can create premature engine failure. Similar measurements and monitoring is needed in other reciprocating apparatus, such as gas compressors.

Such engine conditions will result in changes in the maximum travel of the engine pistons at both top and bottom positions. Prior monitoring instruments for detecting these conditions have included break-away stems connected to pressurized fluid lines and positioned so as to break and release the fluid pressure whenever the piston bottom travel exceeds a preset tolerance, bringing the piston against the stem and snapping it off.

The break-away system tolerance must be set large enough so that activation of it, which of necessity involves engine shut down, does not occur until a significant change in piston bottom is experienced. Otherwise, too frequent engine shut downs would take place. The existence of a large tolerance, however, permits gradual changes in piston travel, indicative of effects that could be remedied in many cases, from being detected. Activation of the break-away detector also requires restoration of the break-away unit by expensive and time consuming repair work.

SUMMARY OF THE INVENTION

The present invention relates to a nondestructive system to continuously monitor maximum travel limits such as found in piston bottom travel in an internal combustion engine and piston compressors. The monitoring system includes proximity probes mounted inside an engine to sense each piston bottom position and associated system electronics for providing a continuous indication of the maximum piston bottom excursion.

In typical implementation, the engine is instrumented with an eddy current proximity probe for each piston. The cylinder liner for each piston supports a structure from which a proximity probe extends to a location that permits it to sense piston bottom travel, such as its motion over ten mills (full scale) either side of bottom. The support structure may include a conventional break-away stem to provide the added security it brings along with the confidence of known technologies as a selling point. A reference probe is provided near to the other probe and is set to sense an invarient dimension so that environmental effects, such as temperature, can be compensated to provide a stable zero reference point.

Both probes are energized through the same oscillator to avoid errors associated with different drive circuits. A threshold is set as a function of the signal from the reference probe beyond which the sensing probe output is allowed to vary. The threshold is established at, for example, ten mills above the initial extreme of bottom travel of the piston. For piston positions beyond this threshold only, the sensing probe output is permitted to vary in accordance with piston position. The threshold varies with environmental effects and thus continuously compensates for changes in the sensing probe signal due to environmental effects. The sensing probe signal representative of piston bottom travel is peak detected once for each piston cycle and digitized as a numerical indication of the piston bottom position. Typically, the digital representations of piston bottom travel are averaged over a number of cycles to mask the effects of vibration that might cause cycle to cycle variations not representative of actual piston travel.

The digitized and averaged representations of bottom position for each piston are displayed for operator verification of engine condition. The display can be a single display switched between the digital representations for each piston, or separate displays for each piston. Additionally, the digital values can be displayed as bar graphs showing each cylinder in an adjacent format that quickly identifies misalignments.

The peak detection function is suppressed in a manual mode, providing digitizing and display of actual piston positions periodically. This allows manual engine rotation to the point of maximum piston travel for initial probe positioning and threshold setting.

Additional embodiments are shown wherein the present invention accurately monitors the position and dimensions of other engine components and structures. In particular engine block twist is detected by a set of block mounted probes which measure distance to a wire strung from one end of the engine to the other.

BRIEF DESCRIPTION OF THE DRAWING

These and other features of the present invention are better understood by reading the following, solely exemplary, detailed description along with the drawing wherein.

DETAILED DESCRIPTION

Figure 1:
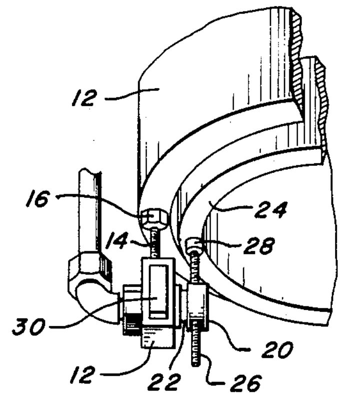
FIG. 1 is a pictorial view of the internal engine mounting of a piston travel monitoring proximity probe.
Figure 2:
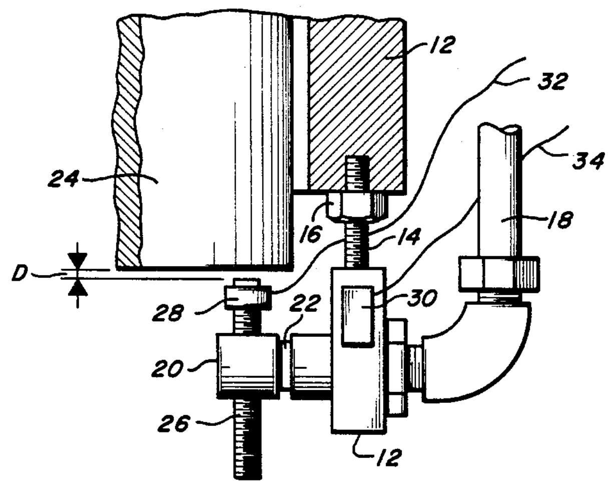
FIG. 2 is a side pictorial view, partially in section, of the proximity probe mounting of FIG. 1.

FIGS. 1 and 2 illustrate a fixture for mounting proximity probes inside an engine in association with each piston in order to sense the bottom travel of each piston. In particular a manifold 12 is mounted to a cylinder liner 10 by a threaded rod 14 and locked in place by a nut 16. The manifold 12 receives oil under pressure through a conduit 18 to the manifold 12 where it is applied to a breakoff stem 20 having a neck portion 22 of reduced and weakened cross section to permit fracture. Fracture is induced when the bottom of a piston skirt 24 exceeds its normal minimal point of travel and comes against a head portion of a threaded rod 26 which projects upwardly from the end of the stem 20. Normally a clearance of several mills, such as ten mills represented by the dimension "D", is provided between the lowest or bottom point of the piston skirt 24 in its normal cycle and the head of the threaded rod 26. This is provided to accommodate normal fluctuations in the bottom point without causing fracture of the stem 20.

In accordance with the present invention, a first proximity probe 28 is placed on the head of the threaded rod 26 and oriented to be in a position to sense the distance to piston skirt 24. A reference probe 30 is affixed to the manifold 12 and has associated with it an element located a fixed distance from the probe sensing face so as to read a substantially constant distance. The probes 28 and 30 are located close to each other so as to be similarly influenced by the same environmental factors. Electrical leads 32 and 34 are provided for excitation and output signals for the respective probes 28 and 30.

Figure 3:
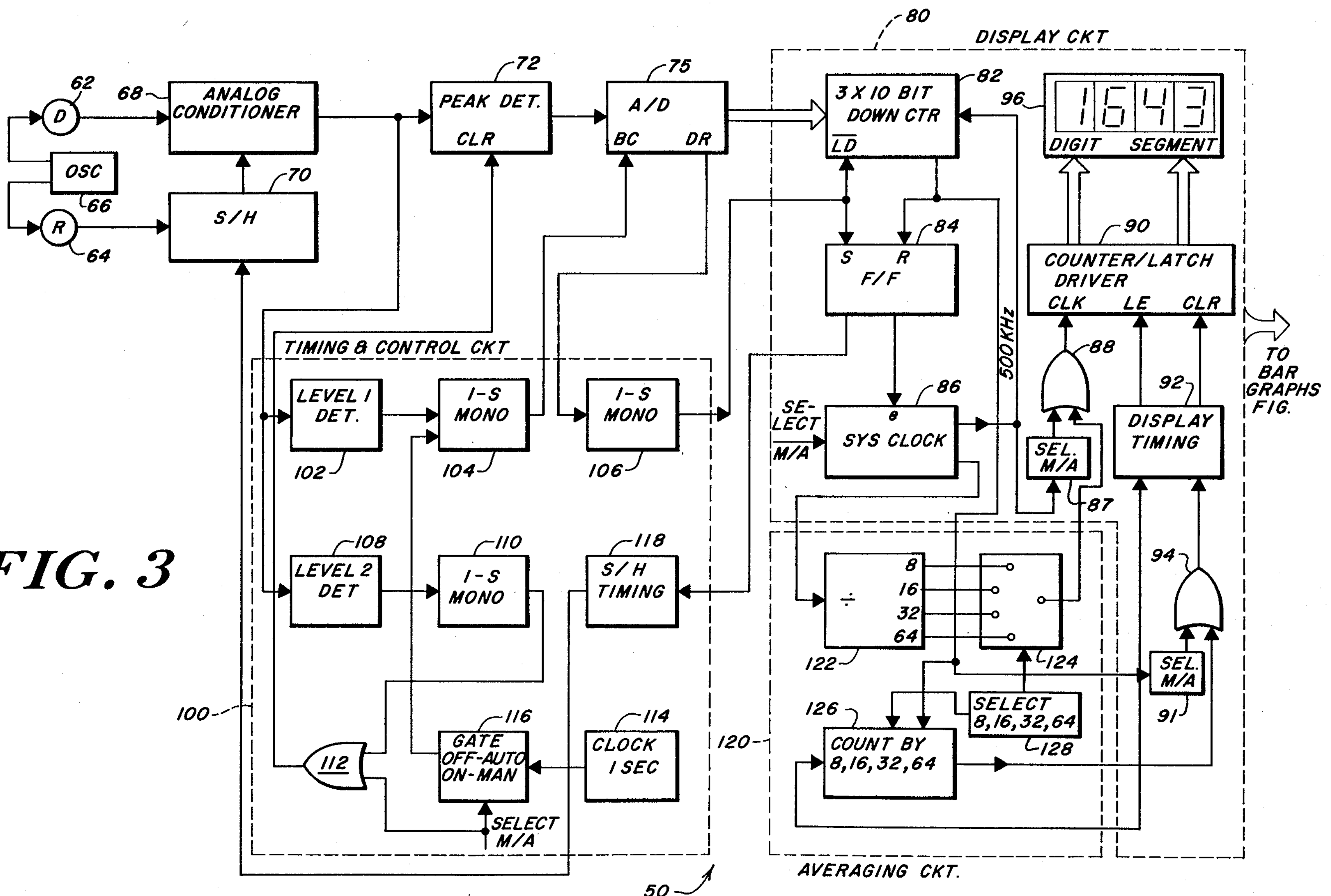
FIG. 3 is a block diagram of a distance-measuring system according to the present invention.

Electrical circuitry associated with the probes to permit measurement of the variation in the distance D and in particular the bottom point for the piston skirt 24 is illustrated in FIG. 3. As shown there, first and second probes 62 and 64, corresponding to the probes 28 and 30, are energized from a single oscillator 66, as shown in U.S. patent application Ser. No. 444,442, filed Nov. 24, 1982 herein incorporated by reference. The output signal of the active or measuring probe 62 is applied to an analog signal conditioning circuit 68 which establishes a threshold signal level according to the signal from the reference probe 64 applied to it from a sample and hold circuit 70. The sample and hold circuit 70 provides a continuous output signal from the reference probe 64 selected once each engine piston cycle.

The threshold signal applied to the analog signal conditioner 68 is derived from the signal held in the sample and hold circuit 70 to correspond to a signal level that would be produced by the active probe 62 when the piston skirt 24 is a predetermined distance, typically 10–16 thousandths of an inch above the normal bottom point. In effect, the output of the probe 62 is differenced with the output of the sample and hold circuit 70 in the analog signal conditioner 68 and that difference is blocked for all conditions reflecting piston skirt positions above the threshold level and unblocked, varying with piston skirt position below that threshold. In this manner the environmental influence on the reference probe 64 removes substantially the same environmental influence on the active probe 62 thereby compensating it for engine effects such as temperature variations, and allowing a stable zero reference point to be determined. The signal blocking effect prevents large amplitude signals of the active probe 62 from saturating the circuitry. The gain of circuit 68 is typically adjustable to adjust the values of the ultimate readout to a desired scale.

The output of the analog signal conditioner 68, representing a signal varying for only a very short portion of the piston travel cycle when it is within typically 10–16 thousandths of an inch of its bottom point, is inverted and applied to a peak detector circuit 72 which operates to sense the peak value in the output of the probe 62. The peak detector is operable to automatically capture and store signal peaks. The peak detector includes a switch 73 which, when in automatic operation, applies the received signal to the remaining detector elements when the peak approaches, and is open the remaining part of the piston cycle. This point reflects the position of maximum bottom travel of the piston skirt 24. The peak detector may also be operated to become 'transparent' when the system is in the manual mode (discussed below) according to a control signal from gate 112. When the peak detector is 'transparent' the switch 73 in the peak detector 72 continuously passes the received signal, which is then passed to the peak detector 72 output. The signal peak captured by the peak detector 72 is transfered to an analog-to-digital conversion circuit 75, at a time corresponding to a point after the detected peak. That point is determined by a level detector circuit 102 which reponds to the output of the analog signal conditioner 68 and detects a point in piston travel which is delayed in time by a one shot monostable circuit 104. Delay circuit 104 activates the analog-to-digital converter 75 to respond to the output of the peak detector 72 at a time when the output of the peak detector 72 is certain to represent the actual bottom-most point in the travel of the piston skirt 24 during that cycle. The peak detector 72 is subsequently reset in order to be prepared to respond and sense subsequent peaks by a reset signal generated by a second level detector circuit 108 responding to the output of the analog signal conditioner 68. The second level detector reset signal is delayed in time by a one shot monostable circuit 110. The output of delay circuit 110 is applied through an OR gate 112 to reset the peak detector 72.

The output of the analog-to-digital converter 75 is applied to a down counter 82 within a display circuit system 80 upon command of a delay monostable circuit 106 activated by the converter 75 when it has completed its conversion. At the time of loading of the counter 82, the output of the monostable circuit 106 also sets a flip flop 84 which in turn activates a 500 KHz system clock 86. The output of clock 86 is applied to the counter 82 causing it to count down the ten bit word loaded into it in from the analog-to-digital converter 75. At the end of the count down, the counter 82 applies a reset signal to the flip flop 84 which in turn disables the system clock 86 and triggers a delay circuit 118 to cause the sample and hold circuit 70 to acquire a new sample. In this manner the 500 KHz signal is present for a short period corresponding to the magnitude of the digital word in the counter 82 which in turn represents the magnitude of the signal from the bottom detecting probe 62 at the point of piston skirt bottom position.

The output of the system clock 86 is also applied to a division circuit 122 having four outputs, one each corresponding to division of the basic clock frequency by 8, 16, 32 and 64. One of the thus divided clock outputs is selected by a selector 124 under control of a switch 128 and applied to the input of an OR gate 88. The OR gate 88 passes this signal to the clock input of an accumulating counter 90. Thus, as the counter 82 counts down, the counter 90 counts up at a rate which is 1/8, 1/16, 1/32, or 1/64 of the count down rate as specified by switch 128.

A separate counter 126 is loaded from switch 128 with the digital value 8, 16, 32, or 64 corresponding to which of the outputs of the division circuit 122 are selected and applied to the clock input of the counter 90.

Each time the counter 82 completes its down count, the output signal indicating that event is applied to the counter 126 to decrement it by one count. When counter 126 completes its count to zero from either 8, 16, 32, or 64 as selected from the switch 128, a pulse is applied through an OR gate 94 to a display timing circuit 92. The display timing circuit 92 at this point first causes the contents of the counter 90 to be loaded into a latch circuit within the counter 90 and subsequently clears the accumulating portion of the counter 90 and rests the counter 126 to either 8, 16, 32, or 64 as specified by switch 128. The value of the contents of the counter 90 loaded into the latch are then displayed in a digital display 96 reflecting a value corresponding to the bottom point of the cylinder skirt 24 averaged over 8, 16, 32, or 64 piston cycles. The averaging function is desired in order to mask the effects of noise or vibration that would cause cycle to cycle variations that do not reflect true piston bottom position. The display refresh rates would otherwise be too fast for human perception.

The system can be set into a 'manual' mode according to a manual/automatic selection signal where the switch 73 within the peak detector 72 is continuously 'on', and the peak detector output follows the signal input. In this mode, the peak detector 72 appears 'transparent', effectively causing the output of the analog signal conditioner 68 to be applied directly into the converter 75. The gate 116, blocked in the automatic mode, applies a signal to the single shot monostable circuit 104 in the manual mode at one second intervals from a one second clock 114. This causes the converter 75 to convert and store the output of the analog signal conditioner 68 at one second intervals. The manual select switch also applies a signal to the system clock 86 causing it to run continuously. The clock 86 output is additionally applied through the OR gate 88 to the counter 90 in the manual mode through a switch 87. Correspondingly, a switch 91, activated in the manual mode, causes the signal representing the termination of a down count from counter 82 to be applied through OR gate 94 to the display timing unit 92, repeatedly triggering the latch and clearing functions normally associated only with every 8, 16, 32, or 64 count downs. In this manner the display 96 will reflect the position of the piston skirt 24 with respect to the probe 62 at one second intervals without averaging. This permits the engine to be manually cycled and the range of readings of the probe and its sensitivity to be checked. In addition, the position of the probe 62 relative to the position of the piston skirt 24 at the bottom point can be set to the desired operating point.

Figure 4:
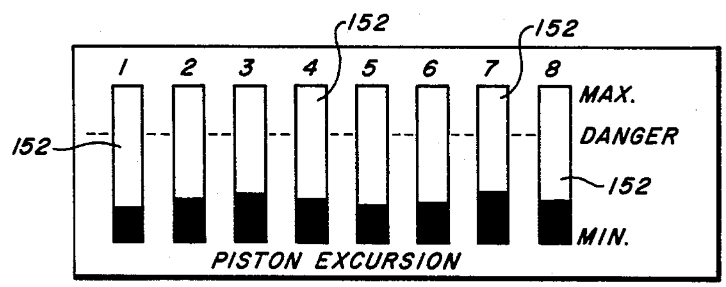
FIG. 4 is a diagrammatic view of a bar graph indicator for use with the present invention.

A separate display 96 may be provided for each piston or a single display may be switched between the counters 90 for each piston. Alternatively a bar display 150 as shown in FIG. 4 may be provided having a set of bar graph displays 152. Each graph display 152 responds to the value of a separate counter 90 associated with each piston. The juxtaposition of the displays 152 allows operator assessment of engine alignment effects as well as piston travel.

Figure 5:
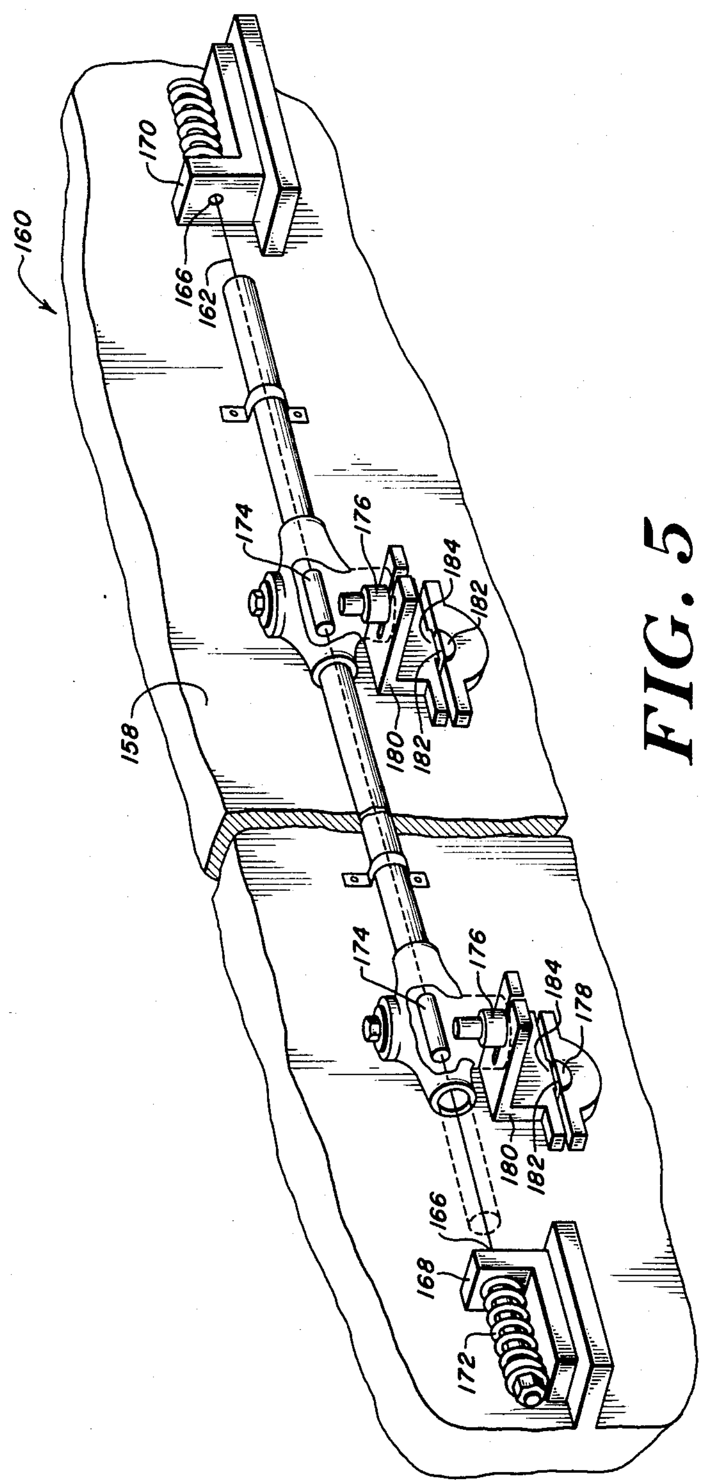
FIG. 5 is a pictorial view of an alternate embodiment of the present invention for monitoring casing alignment.

In alternate embodiments, a plurality of sensors can be used in a similar multichannel system to monitor other elements or dimensions within an engine, or other similar high stress, low tolerance machines. Measurements of engine case dimension and gas compressor crosshead bushing wear are illustrated in the embodiments shown in FIG. 5 and FIG. 6.

In large equipment the alignment along a major dimension is critical. A change in that alignment can be detected according to the embodiment 160 of FIG. 5. A section of taut wire 162 is suspended on the equipment case 158 between two points 164, 166 having an alignment that is critical. The taut wire 162 is supported by fixtures 168, 170 providing a tension thereon by a spring 172 or other means, so that the wire position is not determined by wire relaxation or movement along the axis of the wire. At least one target element 174 is disposed along the suspended wire section 162, wherein a corresponding distance probe 176 is positioned relative to each target 174 in a closely spaced relationship, as described above in previous embodiments. A reference probe 178 is mounted in the same probe assembly 180 at an adjustable distance 182 relative to a reference material 184, typically part of the probe assembly 180. The probes 176 and 178 are connected to system electronics shown in FIG. 3, discussed above, to provide an indication corresponding to the distance between each target 174 and the respective probe 176. Any distortion on the machine case 158 will cause changes in the gaps between the probes 176 and the respective target 174, resulting in a change in the corresponding indicated signal. Vibration and other periodic fluctuations in the wire targets 174 are averaged out in the system electronics.

Figure 6:
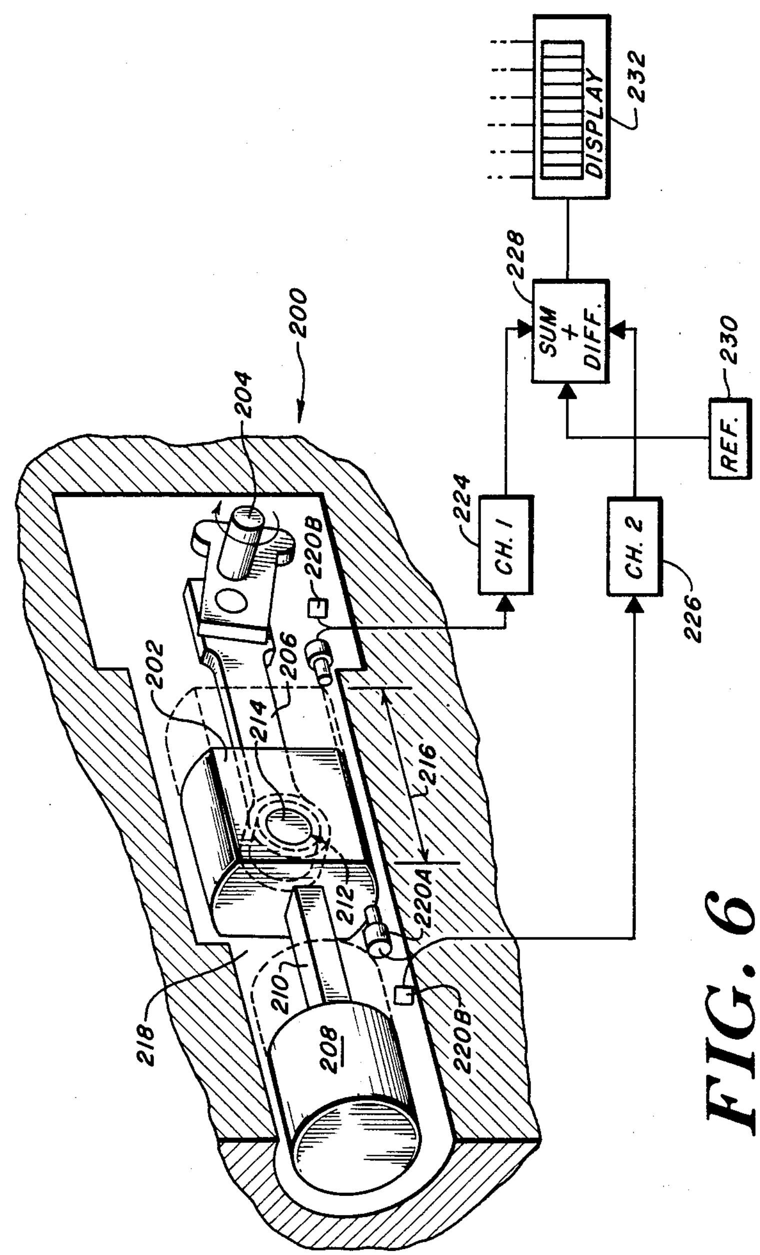
FIG. 6 is a diagrammatic view of an alternate embodiment of the present invention for monitoring crosshead bushing wear.

A section of a gas compressor 200 shown in FIG. 6, which may be an integral part of a piston engine, incorporate an intermediate crosshead 202 member, which transfers energy in a reciprocating motion from a crankshaft 204 and a connecting rod 206, to a piston 208 through a pushrod 210. A critical element in the gas compressor 200 is a crosshead pin bushing 212 mounted within the crosshead 202 retaining the crosshead pin 214, which receives the reciprocating force from the connecting rod 206. As the bushing 212 wears, the crosshead excursion 216 changes. According to this embodiment, the present invention measures the total crosshead excursion 216 with two sets of probes mounted within the cylinder bore 218 spaced apart from the respective crosshead 202 surfaces.

Each set of probes includes distance probes 220A, 222A and reference probes 220B, 222B mounted as discussed above. In the corresponding system electronics 201, the resulting probe signals are received by respective channels 224 and 226 which produce corresponding compensated distance signals. The output signals from channels 224 and 226 each correspond to the counter signal generated internally within the counter 90 of the system 50 shown in FIG. 3, which are applied to respective internal display latches, discussed above. When the system 50 of FIG. 3 is adapted for use in the measurement of crosshead bushing wear, or other applications such as for a bar graph display discussed earlier, the outputs of respective counters 90 are made externally available. The output signals from channels 224 and 226 are combined by a differencing network 228 together with a signal from a reference 230, to produce signals corresponding to the crosshead 202 travel, and in particular, the bushing 212 wear. The output of network 228 is then displayed on a display 232, which may further incorporate displays for crosshead monitors of other cylinders (not shown) in juxtaposition, similar to the arrangement of FIG. 4, discussed above.

The above descriptions are intended to be exemplary only. Additional embodiments of the invention for detecting limits of motion of various physical elements can be realized by one skilled in the art. It is therefore only the following claims which are intended as the definition of the full scope of the invention.

What is claimed is:

1. An extent of travel measurement system comprising:

transducer means for providing a signal corresponding to the position of a cyclically moving element;

detector means responsive to the signal from said transducer means for providing an output signal corresponding to an extreme in the position of said element;

means for averaging said detector means output signal over a selected number of element cycles of motion providing an averaged extreme position output signal; and display means for providing a visual indication of the averaged extreme position output signal.

2. The system of claim 1, wherein:

said transducer means further comprises:

a proximity probe monitored in proximity of said cyclically moving element for providing a signal corresponding to the position thereof.

3. The system of claim 2, wherein:

said transducer means further comprises:

a reference probe sensing a predetermined dimension and mounted to share a common temperature environment with said proximity probe; and means for compensating the position sensed by said proximity probe as a function of the predetermined dimension sensed by said reference probe.

4. The system of claim 3, further including:

means for energizing said proximity and said reference probe from a single source.

5. The system of claim 2, further including:

a plurality of probes, one mounted to sense the position at each of a plurality of moving element positions; and a plurality of circuit means each providing an output indication corresponding to the position of each moving element.

6. The system of claim 5, further comprising:

a bar-graph indicator providing visual indication of each moving element position in juxtaposed relation.

7. The system of claim 1, further including a detector reset circuit receiving said signal from said transducer and providing a reset signal to said detector according to the magnitude of the transducer signal.

8. A measurement system compensated for environmental effects comprising:

an extent of travel measuring transducer providing a first output signal reflecting the position at a cyclically moving element;

a reference transducer providing a second output signal reflecting a constant distance; and means for providing an output indication representing the difference between said first and second output signals when said difference is of one polarity and providing a replacement signal when said difference is of another polarity.

* * * * *